United States Patent [19]
Lisziewicz

[11] Patent Number: 5,184,880
[45] Date of Patent: Feb. 9, 1993

[54] ANAMORPHIC ATTACHMENT FOR PURPOSE OF FILMING AND REPRODUCTION TO BE USED TOGETHER WITH A BASIC LENS

[75] Inventor: Antal Lisziewicz, Göttingen, Fed. Rep. of Germany

[73] Assignee: Isco Optic GmbH, Fed. Rep. of Germany

[21] Appl. No.: 497,177

[22] Filed: Mar. 22, 1990

[30] Foreign Application Priority Data
Mar. 21, 1989 [DE] Fed. Rep. of Germany ....... 3909203

[51] Int. Cl.$^5$ .............................................. G02B 13/08
[52] U.S. Cl. ...................................... 359/668; 359/672
[58] Field of Search ................................ 350/420, 422

[56] References Cited
U.S. PATENT DOCUMENTS
3,041,935 7/1962 Jacobsen ............................ 350/420

*Primary Examiner*—Paul M. Dzierzynski
*Attorney, Agent, or Firm*—Hopkins & Thomas

[57] ABSTRACT

An anamorphic attachment (3) for purposes of filming and reproduction to be used in conjunction with a basic lens (2). At the attachment (3) there is a first subsystem (8) serving the main purpose of enlargement in a first direction and a second subsystem (7) serving the main purpose of enlargement in a direction vertical to the first direction. The first subsystem (8) contains a positive front lens group (12) and a negative rear lens group (13). The second subsystem (7) a negative front lens group (9) and a positive rear lens group (10). The second subsystem (7) is located between the first subsystem (8) and the basic lens (2), providing that the adjacent negative lens groups (13, 9) of the two subsystems (8, 7) may also be exchanged. If the basic lens (2) is set to a focal length Fg and the attachment to the object distance "infinity" and the total focal length is V1·Fg in the first direction and the total focal length V2·Fg in the second direction, the attachment is devised in a way that the condition $(V1/V2)^2 \cdot 0.85 \leq V1 < V2 \leq 1.15 \cdot (V2/V1)^2$ is complied with.

12 Claims, 5 Drawing Sheets

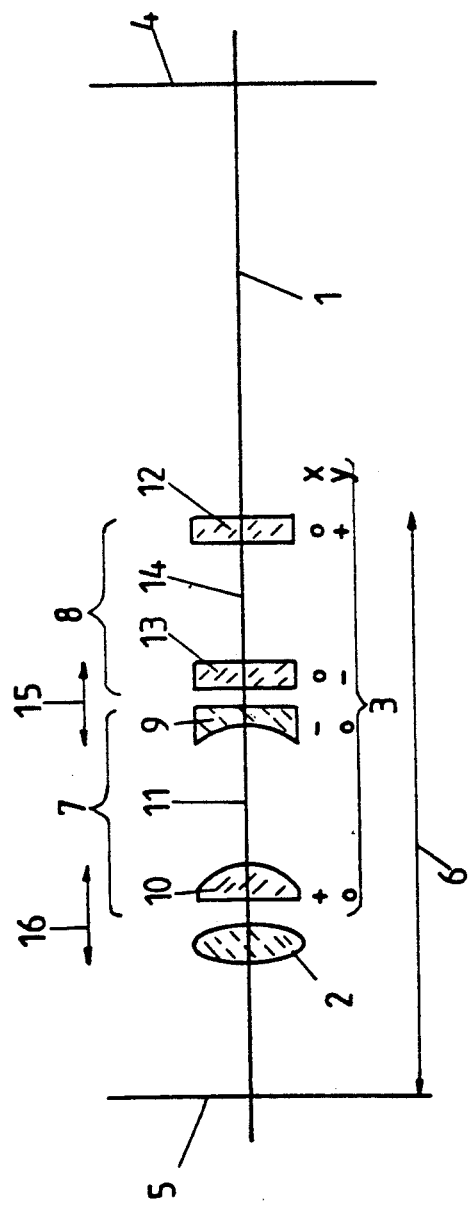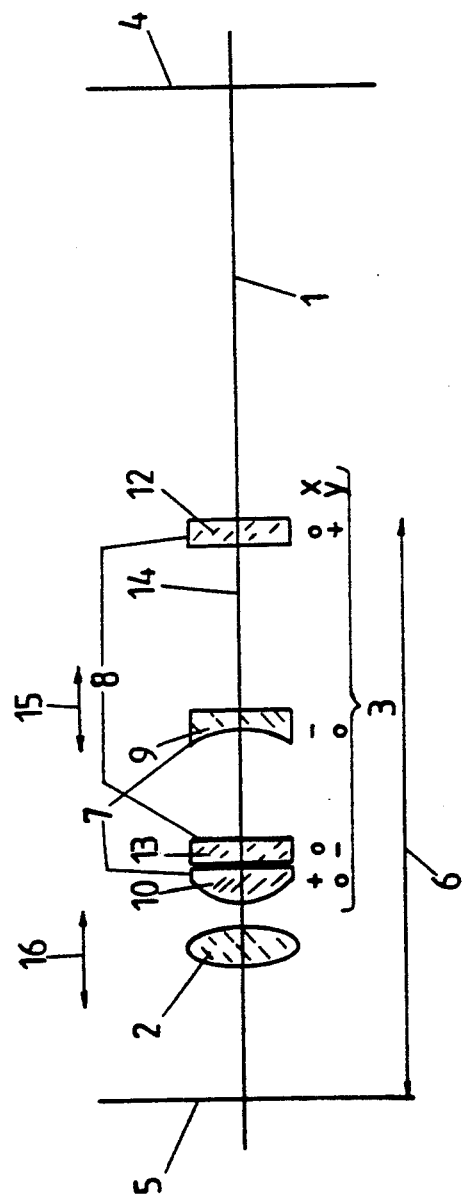

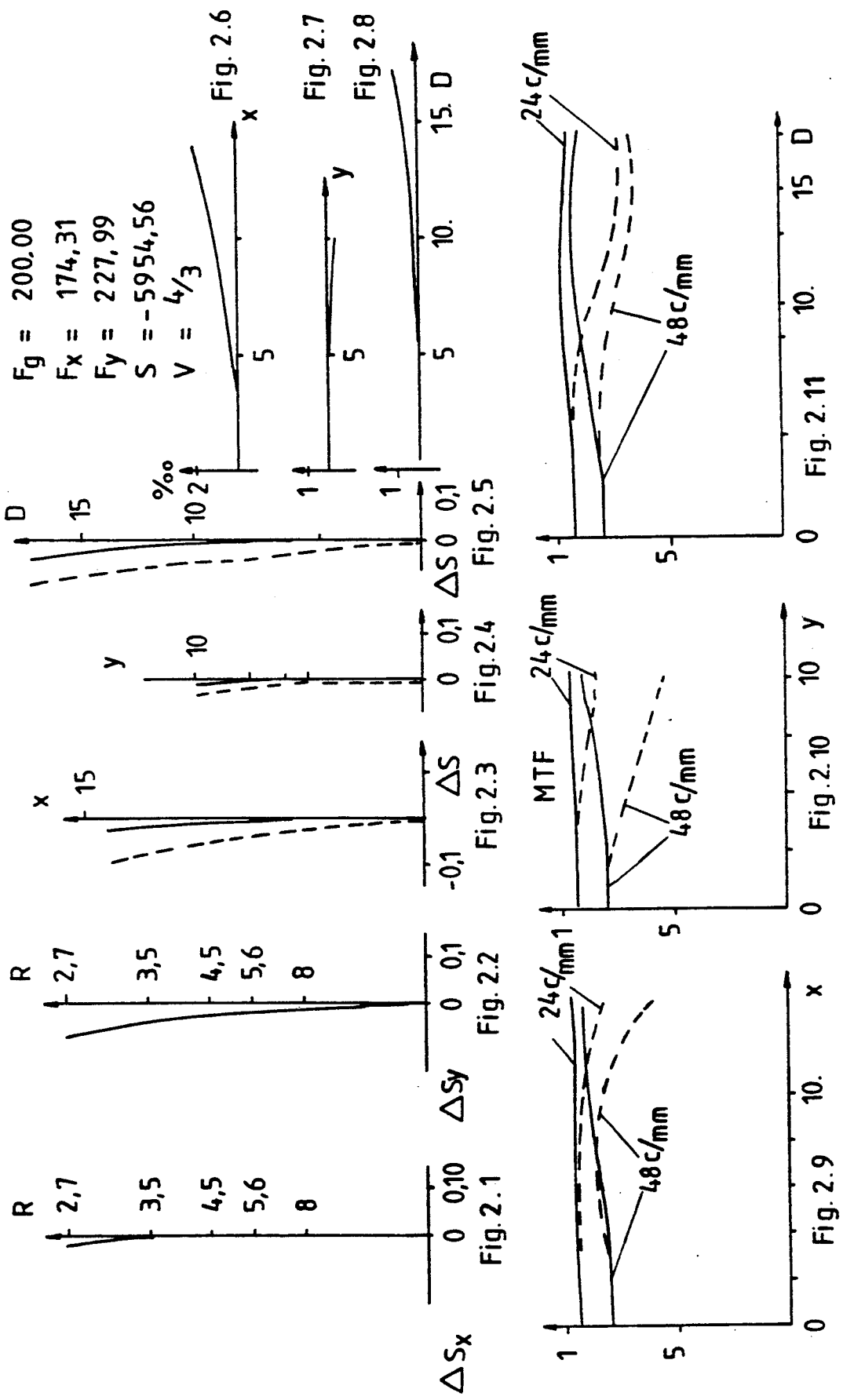

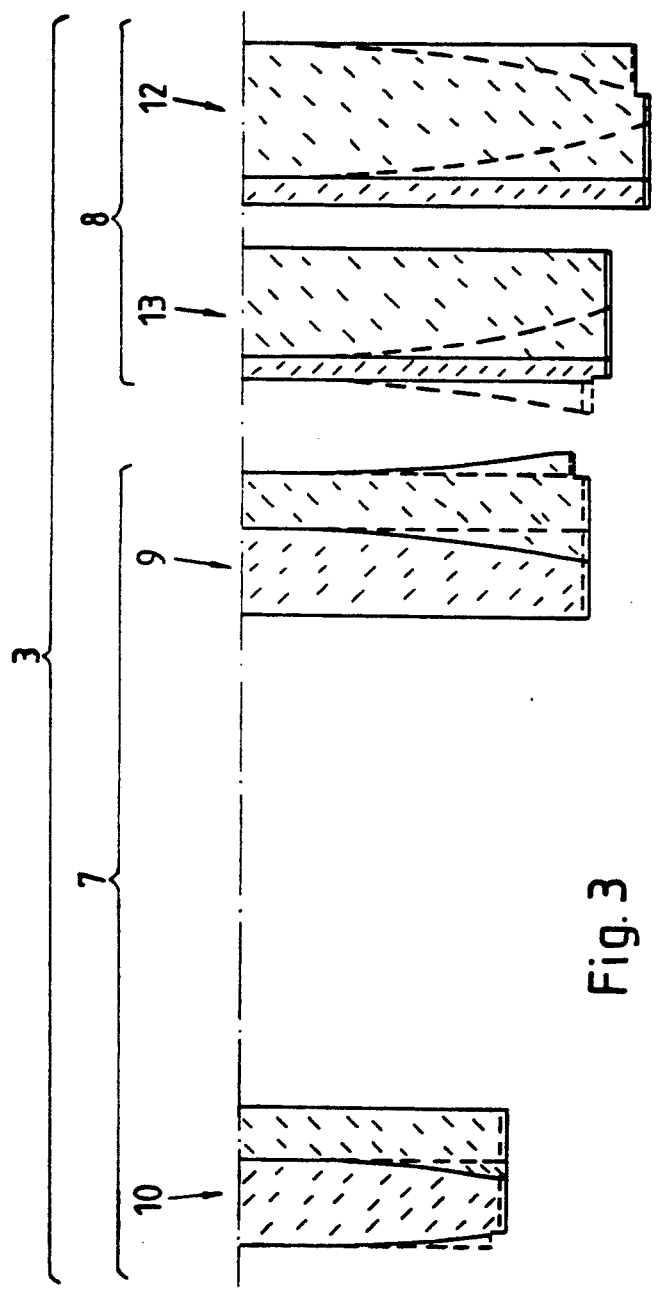

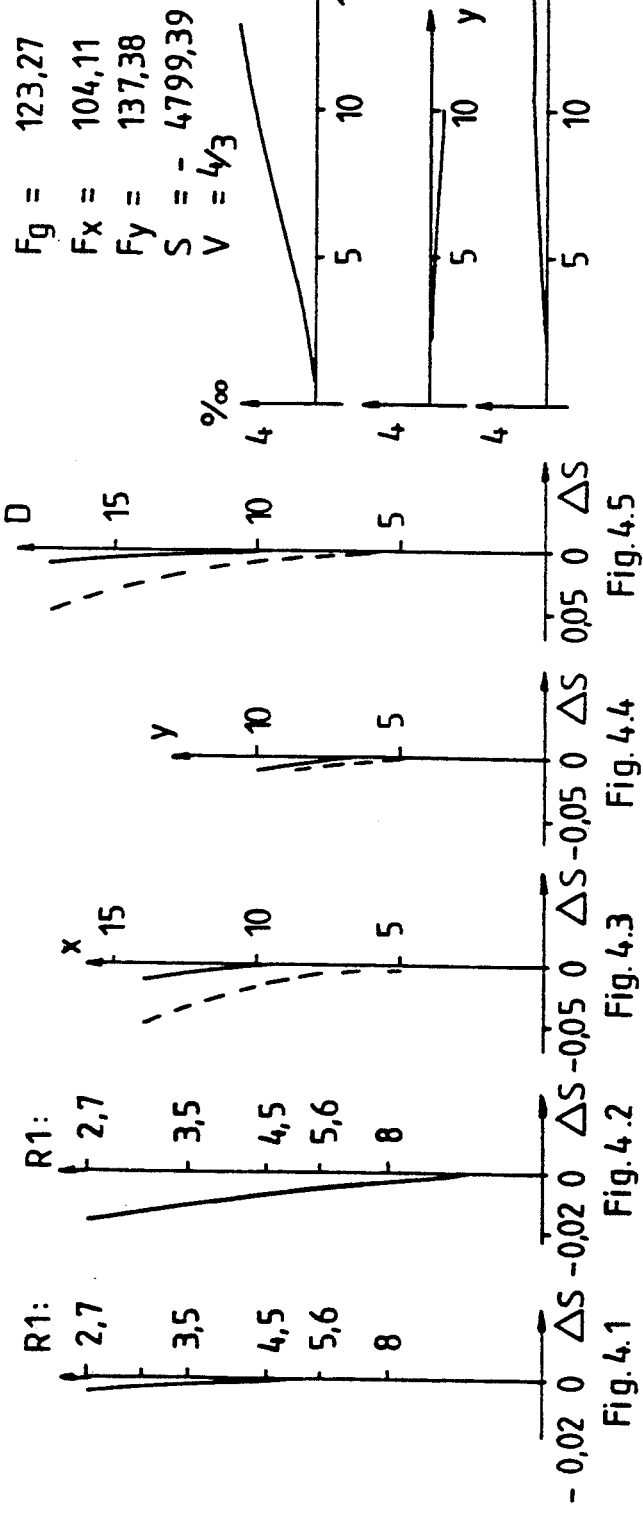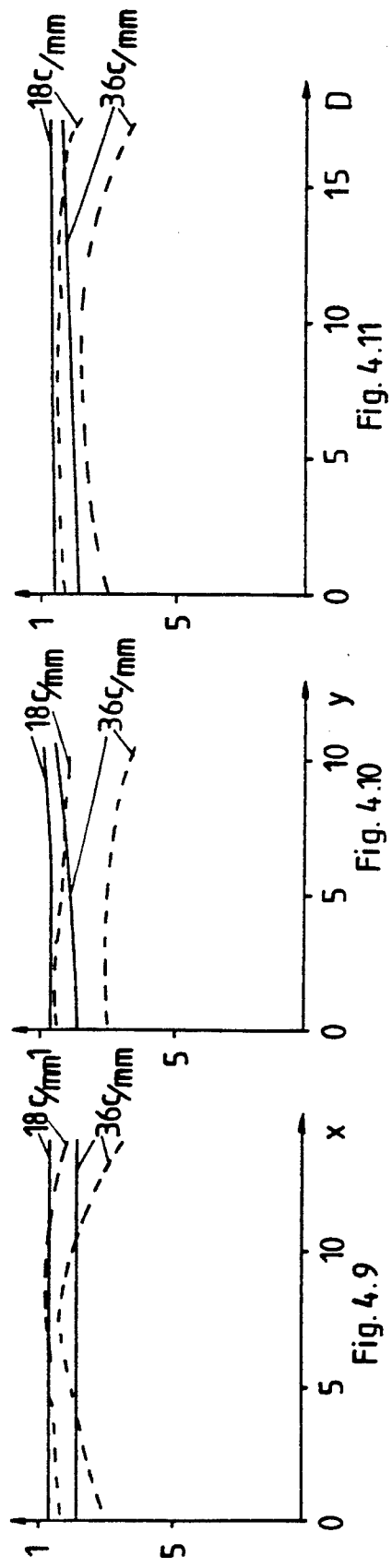

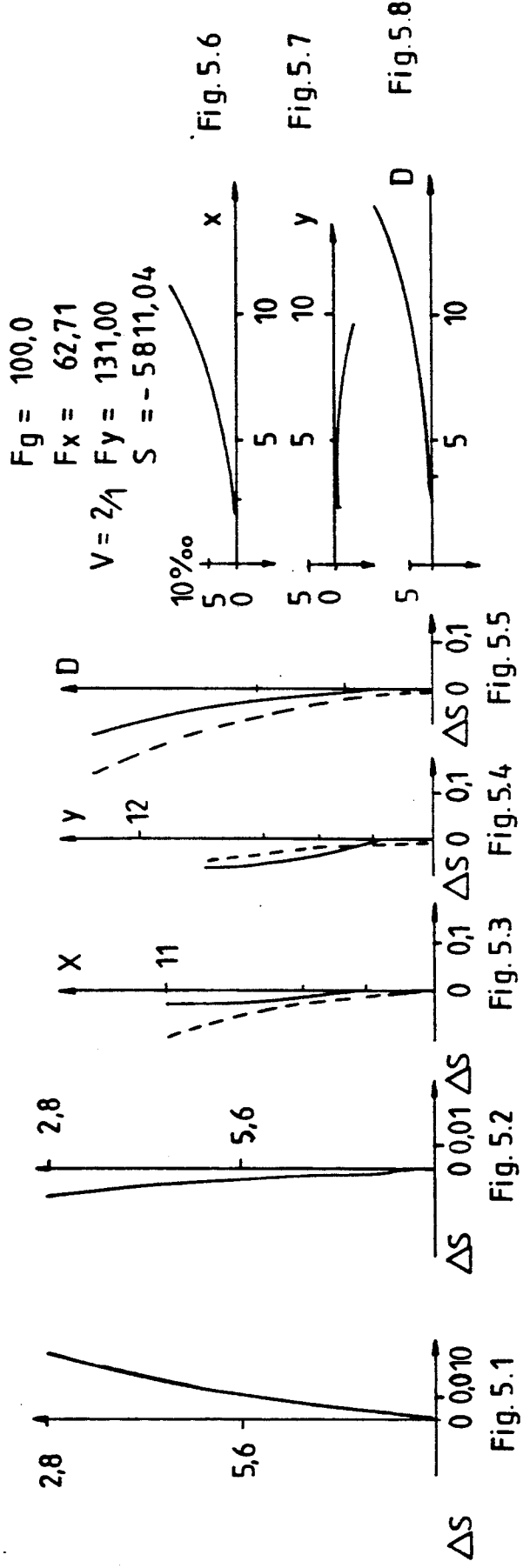
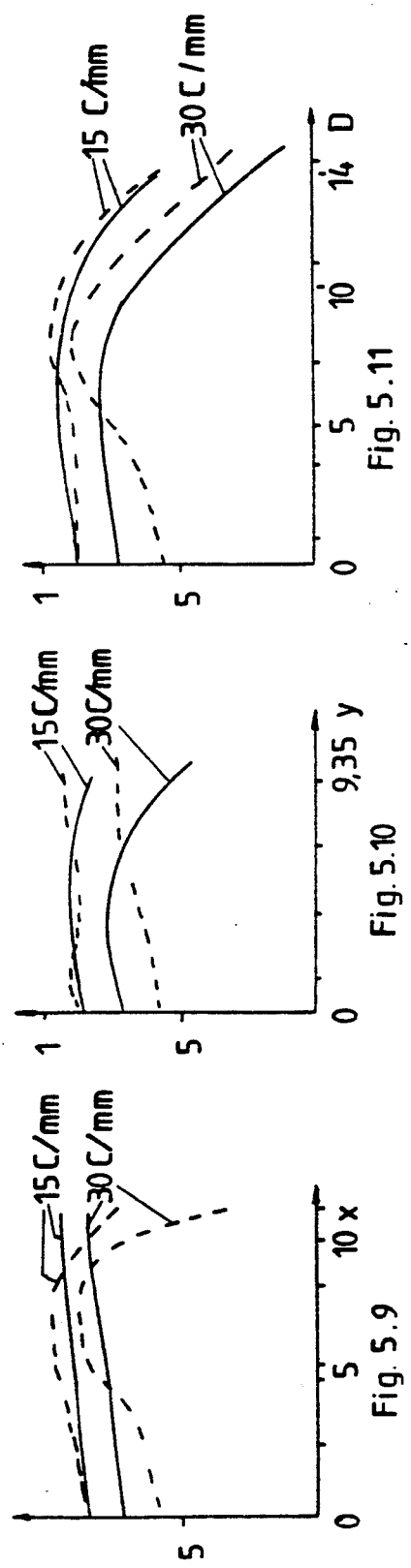
Fig. 5.1 Fig. 5.2 Fig. 5.3 Fig. 5.4 Fig. 5.5 Fig. 5.6 Fig. 5.7 Fig. 5.8 Fig. 5.9 Fig. 5.10 Fig. 5.11

ANAMORPHIC ATTACHMENT FOR PURPOSE OF FILMING AND REPRODUCTION TO BE USED TOGETHER WITH A BASIC LENS

BACKGROUND OF THE INVENTION

The invention relates to an anamorphic attachment for use with the basic lens system of a camera for purposes of filming and for use with the basic lens system of a projector or the like for purposes of reproduction, with a first lens subsystem of the attachment serving the main purpose of enlargement in a first direction and a second lens subsystem serving the main purpose of enlargement in a direction perpendicular or vertical to the first direction, the first subsystem containing a positive front lens group and a negative back lens group and the second subsystem a negative front lens group and a positive back lens group. Such an anamorphic attachment may be used either for purposes of filming, that is as an attachment to a camera, or for reproduction, that is as an attachment to a projection system. In both cases the attachment serves the purpose of obtaining different enlargements in two directions perpendicular to each other, in particular of the horizontal and the vertical direction. A lens group may also consist of a single lens.

U.S. Pat. No. 3,041,935 of Jacobsen shows an anamorphic attachment of the type described at the outset. The attachment is composed of two lens subsystems. The first subsystem has anamorphic properties in the first direction. The second subsystem has anamorphic qualities in the second direction that is perpendicular to the first direction. The first subsystem begins with a divergent or negative lens as front lens group and ends with a convergent or positive lens as rear lens group. The subsystem forms an afocal system. The second subsystem begins with a positive, cylindrical lens, i.e. with a convergent lens, as front lens group and ends with a negative lens as rear lens group. Also the second subsystem is afocal. Both subsystems lead to a different enlargement in the respective directions. The anamorphic factor is a result of the ratio of the enlargements in these two directions. If the front lens group of the second subsystem consists of a single lens, and is not divided into two lenses, there is no possibility of focusing. An attachment of this type may only be used for a certain distance. However, if the front lens group of the second subsystem is divided into two cylindrical lenses, focussing becomes possible. The division of the front lens group of the second subsystem is subject to the prerequisite that the air space between the two cylindrical lenses of the front lens group of the second subsystem is determined by the air space between the front lens group and the rear lens group of the first subsystem. Then, it is possible to combine the two cylindrical lenses, which are located in the same place, to a spherical lens, since their focal lengths are in accordance. The basic lens must be readjustable. The lenses of both subsystems, however, do not only have the effect in the desired direction but inevitably also in the other direction. It is very difficult to correct the resulting image distortion. Besides, correction is confined to small entrance pupils. If the diameter of the entrance pupil of the basic lens is greater than 30 mm, then the attachment may not be corrected, unless the attachment is longer than 300 mm. However, this would mean too much effort, which is why this system cannot be used for greater entrance pupils. Another disadvantage is that in the case of the embodiment which may be focussed the anamorphic factor, that is the ratio of the enlargements in the one and the other direction or the ratio of the focal lengths in the one to the other direction changes tremendously.

The change of the anamorphic factor when focussing should be as small as possible. An anamorphic attachment for a basic lens is known from DE-OS 36 29 438, where a different principle is applied. It provides for a first subsystem in which spherical lenses are used so that the characteristics in both directions, which are vertical to each other, are the same. This subsystem is composed of spherical lenses and linked to a second subsystem which eliminates the effect of the first subsystem in only one of the two directions. The advantage of this principle is that the focussing is possible by means of the anamorphic attachment located in front of the basic lens without requiring that the basic lens be readjusted. Another advantage of this principle consists in that it leads to no enlargement in one direction, i.e. there is a representation ratio of 1:1. Hence, this anamorphic attachment leads to only minor, negligible image distortion in this direction. Only the image distortion into the other direction needs to be corrected. The disadvantage of this principle is that the correction of the image distortion may only be done for small image angles.

SUMMARY OF THE INVENTION

It is the object of the invention to create an anamorpic lens system attachment of the type described at the outset for which it is possible to correct image distortion for greater image angles than has been possible with prior art systems.

This is achieved, in accordance with the invention, by locating the second lens subsystem thereof between the first subsystem and the basic lens of the camera or projector with which the attachment is used, the two lens groups installed next to each other being exchangeable, and by designing the attachment in a way that, if the basic lens is set to a focal length Fg and the attachment focal length to the object distance infinity such that the total focal length is V1 · Fg in the first direction (where V1 is the enlargement or magnification in one of the mutually perpendicular directions) and the total focal length in the second direction is V2·Fg, the (where V2 is the enlargement or magnification in the other one of the mutually perpendicular directions) condition $(V1/V2)^2 \cdot 0.85 \leq V1 < V2 \leq 1.15 \cdot (V2/V1)^2$ is complied with. The front lens groups and the rear lens groups of the two subsystems are not located in an interlaced way as in prior art, but each subsystem with its front and its rear lens group remains linked according to a first possibility, the front lens group being separated from the rear lens group in each subsystem by an air space not equal zero. On the side of the attachment facing the object the complete first subsystem is located whose front lens group is positive, i.e. it consists of one or several lenses which as a whole have convergent qualities, followed by the rear lens group of the first subsystem composed of one or several lenses having negative, i.e. essentially divergent properties. The second subsystem, whose front lens group is negative and whose rear lens group is positive, is located behind this first subsystem. Hence, this second subsystem is located at the side of the attachment facing the basic lens and thus the focal plane. Since each of the two subsystems are preserved and their arrangement is not affected by sections of the other subsystem, it is possible to correct image distortion in a simple way, because the correction within a subsystem is only adjusted for the effects in the direction in which the relevant subsystem is active. In other words, image correction in one subsystem does not significantly affect image correction in the other subsystem. This autonomous image distortion correction in the one direction and in the other direction may be effectuated with far less difficulty than a common image distortion correction which needs to act upon both directions at the same time, as is the case in prior art. The arrangement of the two subsystems which follows a different principle than in prior art, that is adding the first subsystem in front of the second subsystem, as seen from the basic lens, surprisingly brings about the additional advantage that focussing becomes possible by joint moving of the rear lens group of the first subsystem and the front lens group of the second subsystem relative to the focal plane. In the course of this process, the rear lens group of the second subsystem and the basic lense are following along. This may be realized via a radial cam dependent on the joint moving of the rear lens group of the first subsystem and the front lens group of the second subsystem. Amazingly, when focussing the change in the anamorphic factor is relatively small. According to the design of the attachment, the effort and the purpose the percentage change of the anamorphic factor amounts to values in between some 10ths % to approx. 1% with an average anamorphic factor of 4:3 and up to approximately 4% with an anamorphic factor of about 2:1. Another advantage of the new attachment is that, when using an attachment which is corrected in regard to image distortion, the image distortion of the basic lens is not significantly enhanced by the attachment, which signifies that such a corrected attachment may also be used with highest-resolution basic lenses without causing a recognizable change in the total resolution capacity. In the second possibility, according to the invention, the sequence between both divergent lens groups is inverted. This leads to the possibility to combine the lenses of both lens groups and, in this way, to reduce the number of lenses. Also cylindrical lenses with intersecting axes may be used. It it also possible to utilize lenses with cilindrical or spherical surface. By exchanging the rear lens group of the first subsystem and the front lens group of the second subsystem the common basic arrangement—positive lens group, negative lens group, negative lens group, positive lens group—is not discarded.

For the adjustment of different object distances (focussing) the front lens group of the second subsystem and/or the rear lens group of the first subsystem may be movable in a way that also the rear lens group of the second subsystem and the basic lens are following along. With this, the distance between the first surface of the first subsystem and the focal plane of the basic lens is kept constant. Therefore, the distance between attachment and basic lens does not change. If, however, the distance between attachment and basic lens changes, the result will be a different distance between the first surface of the first subsystem and the focal plane of the basic lens. Such focussing offers the advantage that the anamorphic factor remains approximately constant throughout the applied focussing range.

If all lenses used for the attachment possess refractive indices which do not differ from one another by more than 5%, the result will be extraordinarily good image quality.

For image distortion correction there exists also the possibility that the front lens group and/or the rear lens group of the second and/or the first subsystem comprise at least two lenses with different Abbe coefficients. This renders it possible to achieve very good color correction by means of using only four lenses in each subsystem divided into two lenses for the front lens group and two lenses for the rear lens group. In each section two types of glass with essentially similar refractive indices and different Abbe coefficients are used accordingly.

There exists the possibility that the lenses installed at the attachment are harmonized i.e., have thicknesses and radii of curvature calculated in such a way that the prescribed anamorphic factor (V1/V2) (nominal value) is achieved between "infinity" and minimum object distance. Hence, the prescribed anamorphic factor is not reached at "infinity" but at an intermediate position of the focussing. In this way, it is possible to minimize the percentage deviation of the anamorphic factor. If the sequence of the two divergent lens groups which face each other is inverted, it becomes feasible to combine at least one lens group with the adjacent convergent lens group to a lens group. This helps reduce the number of lenses at the attachment.

BRIEF DESCRIPTION OF THE DRAWING

Basic design and preferred embodiments of the invention are described in a more detailed way in the drawings.

FIG. 1a shows the first basic design and arrangement of the subsystems at the attachment in connection with the basic lens, FIG. 1b shows the second possibility of arrangement in accordance with the invention, FIGS. 2.1-2.11 show the image distortion curves for the attachment of an embodiment example 1 as represented also in FIG. 1a, FIG. 3 shows the arrangement and design of the attachment lenses of an embodiment example 2, FIGS. 4.1-4.11 show the image distortion curves pertaining to embodiment example 2 and FIGS. 5.1-5.11 show the image distortion curves pertaining to an embodiment example 3.

DETAILED DESCRIPTION

FIG. 1a represents the most simple embodiment possibility of the attachment of this invention and, at the same time, the basic arrangement and design. In FIG. 1a the optical axis 1 of a basic lens 2 (i.e., the existing lens or lens system of a camera or projector) and an anamorphic attachment 3 that embodies principals of the invention are shown. At the side of the attachment 3 not facing the basic lens 2 an object plane 4 perpendicular to the optical axis 1 is indicated as for example, the object position when filming or in the form of a screen when reproducing. At the other side there is a focal plane 5 in which the film rests when filming or reproducing. The distance 6 between the entrance surface of the attachment 3 and the focal plane 5 is predefined as fixed value. The attachment 3 contains a second subsystem 7 and a first subsystem 8 as known from prior art (FIGS. 1 and 3 of the U.S. Pat. No. 3,041,935) of course the designations "first" and "second" are arbitrary and are used herein for purposes of illustration. The second subsystem 7 is designed and devised for the enlargement into the one direction, for example into the x-direction (i.e., in the plane of the drawing sheet), and consists of a front lens group 9 in the most simple case of one negative, i.e. divergent lens and of a rear lens group 10 in the most simple case of one positive, i.e. convergent lens. For advanced types, as explained by means of FIG. 3, the front lens group 9 may be composed of several lenses—as a whole essentially negative—and the rear lens group 10 of several lenses—all in all essentially positive. Between front lens group 9 and rear lens group 10 an air space 11 not equalling zero is provided for. It is the second subsystem 7, and not the first subsystem 8 that achieves an enlargement in the viewed and represented x-direction, which is the reason why a front lens group 12 formed in the range of the first subsystem 8 and a rear lens group 13, are represented in the common plane of representation of FIG. 1a (x-direction) as lenses confined by flat surfaces. Indeed, also in this case the front lens group 12 in its most simple form may consist of a single lens, and in more advance forms of several lenses. In a likewise manner, the rear lens group 13 of the first subsystem 8 consists in its most simple form of one lens, and in more advanced forms of several lenses. The lens or lenses of the front lens group 12 and of the rear lens group 13 of the first subsystem 8 are not effective in the x-direction (i.e., perpendicular to the plane of the drawing sheet). In the y-direction the lens or lenses of the front lens group 12 are positive and the lens or lenses of the rear lens group 13 negative. Also in this case, cylindrical lenses are used. Between the front lens group 12 and the rear lens group 13 of the first subsystem 8 an air space 14 is provided for which also does not equal zero.

For the focussing, the rear lens group 13 of the first subsystem 8 and the front lens group 9 of the second subsystem 7 are moved simultaneously according to arrow 15 relative to the front lens group 12 of the first subsystem 8, while the rear lens group 10 of the second subsystem 7 and the basic lens 2 may follow along according to arrow 16. Naturally, focussing can be done in the inverted way. This depends only on the relative motion.

As to the basic arrangement of the two subsystems 7 and 8, it must be noted that these subsystems 7 and 8 are not interlaced as customary in prior art, but that the second subsystem 7 and also the first subsystem 8 are arranged as individual and separate neighboring units, the subsystem 7 having to be located entirely between the subsystem 8 and the basic lens 2, and not vice versa.

The second possibility of basic arrangement is represented in FIG. 1b. It may be distinguished from the possibility shown in FIG. 1a only in that the rear lens group 13 of the first subsystem 8 and the front lens group 9 of the second subsystem 7 are located in an exchanged way. In both cases (FIG. 1a, FIG. 1b) the basic sequence at the attachment 3—positive lens group, negative lens group, negative lens group, positive lens group—is maintained. This renders it possible to reduce the number of lenses. Lens groups 10 and 13 and/or lens groups 9 and 12 may be combined to one lens each.

Embodiment example 1

This most simple embodiment example 1 is structured in a way that the entire attachment consists of only four lenses whose basic arrangement and physical shape is represented in detail in FIG. 1a. Such an attachment 3 can be used for television projection systems in which one picture tube is provided for each of the three basic colors red, blue and green. For each basic color a basic lens 2 and a pertaining attachment 3 is provided. This renders color correction unnecessary; this explains why a total of four lenses will suffice for each attachment 3. For each attachment the same four lenses are inserted, while merely the adjustment of the four lenses is optimized according to the specific color. The following numbers for the first and every ensuing embodiment example are as a rule specified in mm.

| Focal length of the basic lens | $Fg = 200.00$ |
| Focal length of the basic lens and of the attachment (entire system) in the first direction (horizontally) | $Fx \leq 171.31$ |
| Focal length of the basic lens and of the attachment (entire system) in the second direction (vertically) | $Fy = 227.99$ |
| Number of glass surfaces (attachment + basic lens) | 10 |
| Number of colors | 4 |

The attachment comprises glass surfaces 1 through 8, whereas glass surfaces 9 and 10 belong to the basic lens 2, the basic lens 2 having been input as ideal lens, i.e. free of image distortion, into the calculation for the dimensioning of the attachment.

The calculation was done with the four following colors in the four specified wave lengths green, red, blue and green:

| 1 | 587.5618 |
| 2 | 656.2725 |
| 3 | 486.1327 |
| 4 | 587.5618 |

In the following table the cylindrical surfaces CS and spherical surfaces RS are distinguished according to their form. The second column contains the radii, the third column the distances and the fourth column the relevant types of glass, a line symbolizing an air gap. The last three columns show the refractive indices:

| I | form | radii | distances | glass | refractive indices | | |
|---|---|---|---|---|---|---|---|
| 0 | | | | | 1.00000 | 1.00000 | 1.00000 |
| 1 | CS | 630.493 | 28.025 | LaK 8 | 1.71300 | 1.70897 | 1.72222 |
| 2 | RS | Infinite | 102.508 | — | 1.00000 | 1.00000 | 1.00000 |
| 3 | RS | −6370.000 | 29.109 | LaK 8 | 1.71300 | 1.70897 | 1.72222 |
| 4 | CS | 600.068 | 5.470 | — | 1.00000 | 1.00000 | 1.00000 |
| 5 | CS | −461.851 | 33.280 | LaK 8 | 1.71300 | 1.70897 | 1.72222 |
| 6 | RS | Infinite | 29.649 | — | 1.00000 | 1.00000 | 1.00000 |
| 7 | RS | Infinite | 41.102 | LaK 8 | 1.71300 | 1.70897 | 1.72222 |
| 8 | CS | −454.799 | 840.000 | — | 1.00000 | 1.00000 | 1.00000 |
| 9 | RS | 103.360 | 10.000 | BK 7 | 1.51432 | 1.51432 | 1.52238 |
| 10 | RS | Infinite | 0.000 | — | 1.00000 | 1.00000 | 1.00000 |

The next table specifies the arrangement of the cylindrical and of the spherical axes for the transfer surfaces. It may be recognized from the first two columns that the centers of the spheres are situated on the optical axis. The third column specifies that the cylindrical axes must be arranged in a vertical and linear way to the optical axis. In the fourth column a zero signifies horizontal direction and a 90 vertical direction. In the fifth column the diameters of the various lenses are listed. The two last columns contain the maximum dimensions of the cylindrical lenses in horizontal direction x and vertical direction y.

| 1  | 0.0000 | 0.0000 | 90.0000 | 90.0000 | 126.000  | 126.000  | 89.500   |
|----|--------|--------|---------|---------|----------|----------|----------|
| 2  | 0.0000 | 0.0000 |         |         | 2280.220 | 2280.220 | 2280.220 |
| 3  | 0.0000 | 0.0000 |         |         | 248.258  | 248.258  | 248.258  |
| 4  | 0.0000 | 0.0000 | 90.0000 | 90.0000 | 215.071  | 161.659  | 141.852  |
| 5  | 0.0000 | 0.0000 | 90.0000 | 0.0000  | 215.071  | 161.659  | 141.852  |
| 6  | 0.0000 | 0.0000 |         |         | 2000.000 | 2000.000 | 2000.000 |
| 7  | 0.0000 | 0.0000 |         |         | 2000.000 | 2000.000 | 2000.000 |
| 8  | 0.0000 | 0.0000 | 90.0000 | 0.0000  | 2014.110 | 2000.000 | 237.988  |
| 9  | 0.0000 | 0.0000 |         |         | 88.706   | 88.706   | 88.706   |
| 10 | 0.0000 | 0.0000 |         |         | 88.706   | 88.706   | 88.706   |

Focussing leads to the following conditions:

The distance between the entrance surface at the front lens group 12 of the first subsystem and the focal plane 5 is 1316.382 and is constant.

In the present table which applies to focussing to various distances the change in air space 14 (E(2)) and 11 (E(5)) and the percentage change of the anamorphic factor are listed in the following columns:

1 foot = 30.98 cm.

| Distance m | feet   | E (2) mm | E (5) mm | d(Fy/Fx) % |
|------------|--------|----------|----------|------------|
| Infinity   |        | 9.100    | 129.061  | −0.18      |
| 100.00     |        | 10.293   | 127.499  | −0.17      |
|            | 260.00 | 10.606   | 127.089  | −0.16      |
| 65.00      |        | 10.937   | 126.657  | −0.16      |
|            | 130.00 | 12.120   | 125.116  | −0.14      |
| 35.00      |        | 12.522   | 124.596  | −0.13      |
|            | 100.00 | 13.033   | 123.930  | −0.12      |
| 25.00      |        | 13.902   | 122.805  | −0.11      |
|            | 75.00  | 14.355   | 122.217  | −0.11      |
| 20.00      |        | 15.115   | 121.234  | −0.09      |
|            | 60.00  | 15.685   | 120.498  | −0.09      |
| 17.00      |        | 16.190   | 119.847  | −0.08      |
|            | 50.00  | 17.019   | 118.777  | −0.07      |
| 15.00      |        | 17.149   | 118.613  | −0.06      |
|            | 45.00  | 17.913   | 117.630  | −0.05      |
| 12.50      |        | 18.784   | 116.512  | −0.04      |
|            | 40.00  | 19.033   | 116.193  | −0.04      |
| 11.00      |        | 20.129   | 114.788  | −0.02      |
|            | 35.00  | 20.479   | 114.342  | −0.02      |
| 9.50       |        | 21.909   | 112.519  | 0.00       |
|            | 30.00  | 22.419   | 111.869  | 0.01       |
| 8.50       |        | 23.453   | 110.555  | 0.02       |
|            | 25.00  | 25.154   | 108.398  | 0.04       |
| 7.50       |        | 25.417   | 108.065  | 0.04       |
|            | 23.00  | 26.590   | 106.583  | 0.06       |
| 7.00       |        | 26.617   | 106.549  | 0.06       |
|            | 22.00  | 27.409   | 105.549  | 0.07       |
| 6.50       |        | 28.006   | 104.797  | 0.07       |
|            | 21.00  | 28.308   | 104.416  | 0.08       |
| 6.00       |        | 29.635   | 102.751  | 0.09       |
|            | 19.00  | 30.401   | 101.790  | 0.10       |
| 5.50       |        | 31.570   | 100.324  | 0.11       |
|            | 18.00  | 31.627   | 100.252  | 0.12       |
| 5.00       |        | 33.906   | 97.407   | 0.14       |
|            | 16.50  | 33.756   | 97.594   | 0.14       |
| 4.80       |        | 34.982   | 96.067   | 0.15       |
|            | 15.50  | 35.413   | 95.531   | 0.15       |
| 4.60       |        | 36.156   | 94.609   | 0.16       |
|            | 15.00  | 36.328   | 94.395   | 0.16       |
| 4.50       |        | 36.783   | 93.830   | 0.17       |

This illustrates that the exact anamorphic factor is reached at a distance of 9.5 m and that between 4.5 m and infinity the percentagewise change of the anamorphic factor deviates between 0.17 and −0.18%. This is a very small deviation and thus an excellent value.

The various drawings in FIG. 2 show the image distortion curves of the attachment according to the embodiment example 1 in connection with an ideal (error-free) lens 2. FIG. 2.1 shows the spherical aberration deltaSx of the attachment in the horizontal direction with the basic lens 2 assumed as errorfree. FIG. 2.2 shows the spherical aberration deltaSy of the attachment in vertical direction dependent on the f-number R. FIG. 2.3 shows the image field curvature delta s in the horizontal direction, whereas FIG. 2.4 shows the vertical and FIG. 2.5 the diagonal direction, x corresponding to the horizontal, y to the vertical and D to the diagonal dimensions of the image half. The full lines show the meridional and the dotted lines the sagital image field curvatures. FIGS. 2.6, 2.7 and 2.8 show the distortion in horizontal, vertical and diagonal direction. FIGS. 2.9 and 2.11 show the the transfer function of the attachment and the basic lens. The image dimensions are outlined at the horizontal axes in the directions x, y and D. The curves show the transfer functions of an object with a sinus-shaped intensity distribution, for 24 or 48 cycles/mm in the focal plane. The curves in full lines correspond to the state when the maxima and the minima are parallel to the vertical axis. The dotted curves show the same parallel to the horizontal axis.

FIG. 3 represents a second embodiment example having an arrangement of the kind whose principle is already known from FIG. 1a. Only that in this place the design of the attachment 3 is shown in greater detail. The second subsystem 7 also consists of a front lens group 9 and a rear lens group 10. The front lens group 9 is composed of two puttied lenses whose divergent effect is essentially limited to the horizontal direction. As can be seen from the following calculation of the embodiment example 2, there is also a slight effect in the vertical direction. Also the rear lens group 10 of the second subsystem 7 consists of two lenses exerting convergent (positive) action in the horizontal direction.

To the left of the rear lens group 10 there is, also in this embodiment, the basic lens 2 (not represented). Also front lens group 12 of the first subsystem 8 and rear lens group 13 of the first subsystem 8 consist of two lenses acting in vertical direction. The two lenses of the front lens group 12 have a positive, i.e. convergent effect and the two lenses of the rear lens group 13 have a divergent, i.e. negative effect. In FIG. 3 the design of the eight lenses in horizontal direction is represented in full lines and in vertical direction in dotted lines.

In the following the embodiment example 2 represented in FIG. 3 is specified in the ensuing tables which are to be interpreted analog to the embodiment example 1. The embodiment example 2 can be used for television projection systems in which only one color picture tube is provided for all three basic colors. This renders color correction necessary. The front lens group and the rear lens group of the two subsystems consist of two lenses each so that a total of eight lenses (complete color correction) is mounted at this attachment 3. Image representation of a similar high quality as in the embodiment example 1 is achieved.

The following values apply for the embodiment example 2:

|   |   |
|---|---|
|   | Fg = 123.27 |
|   | Fx = 104.11 |
|   | Fy = 137.38 |
| Number of glass surfaces | 14 |
| Number of colors | 4 |
| 1 | 546.0740 |
| 2 | 643.8469 |
| 3 | 479.9914 |
| 4 | 546.0740 |

| I | form | radii | distances | glass | refractive indices | | |
|---|---|---|---|---|---|---|---|
| 0 |   |   |   |   | 1.00000 | 1.00000 | 1.00000 |
| 1 | CS | 299.799 | 21.906 | LaK 8 | 1.71616 | 1.70962 | 1.72298 |
| 2 | C8 | −253.935 | 4.529 | SF 1 | 1.72311 | 1.71141 | 1.73610 |
| 3 | RS | Infinite | 18.071 | — | 1.00000 | 1.00000 | 1.00000 |
| 4 | RS | Infinite | 17.556 | SF 1 | 1.72311 | 1.71141 | 1.73610 |
| 5 | CS | −243.608 | 3.608 | LaK 8 | 1.71616 | 1.70962 | 1.72298 |
| 6 | C8 | 297.511 | 14.977 | — | 1.00000 | 1.00000 | 1.00000 |
| 7 | C8 | −477.500 | 9.085 | LaK 8 | 1.70962 | 1.70962 | 1.72298 |
| 8 | CS | 331.901 | 14.086 | SF 1 | 1.72311 | 1.71141 | 1.73610 |
| 9 | RS | 5088.330 | 82.735 | — | 1.00000 | 1.00000 | 1.00000 |
| 10 | RS | Infinite | 8.517 | SF 1 | 1.72311 | 1.71141 | 1.73610 |
| 11 | C8 | 408.120 | 13.791 | LaK 8 | 1.71616 | 1.70962 | 1.72298 |
| 12 | C8 | −502.661 | 348.500 | — | 1.00000 | 1.00000 | 1.00000 |
| 1 | 0.000 | 0.000 | 90.000 | 0.000 | 129.000 | 0.000 | 106.000 | 100.000 |
| 2 | 0.000 | 0.000 | 90.000 | 0.000 | 2005.910 | 0.000 | 2200.000 | 153.868 |
| 3 | 0.000 | 0.000 |   |   | 2064.001 | 0.000 | 2000.000 | 510.000 |
| 4 | 0.000 | 0.000 |   |   | 2000.000 | 0.000 | 2000.000 | 2000.000 |
| 5 | 0.000 | 0.000 | 90.000 | 0.000 | 2008.288 | 0.000 | 2000.000 | 182.262 |
| 6 | 0.000 | 0.000 | 90.000 | 0.000 | 450.289 | 0.000 | 238.039 | 382.227 |
| 7 | 0.000 | 0.000 | 90.000 | 90.000 | 305.266 | 0.000 | 238.039 | 191.114 |
| 8 | 0.000 | 0.000 | 90.000 | 90.000 | 9990.990 | 0.000 | 394.563 | 9990.990 |
| 9 | 0.000 | 0.000 |   |   | 197.282 | 0.000 | 197.282 | 197.282 |
| 10 | 0.000 | 0.000 | 90.000 | 90.000 | 2648.601 | 0.000 | 1872.844 | 1872.844 |
| 11 | 0.000 | 0.000 | 90.000 | 90.000 | 1077.572 | 0.000 | 761.959 | 761.959 |
| 12 | 0.000 | 0.000 | 90.000 | 90.000 | 81.800 | 0.000 | 81.800 | 81.800 |
| 13 | 0.000 | 0.000 |   |   | 68.667 | 0.000 | 68.667 | 68.667 |
| 14 | 0.000 | 0.000 |   |   | 68.667 | 0.000 | 68.667 | 68.667 |

The zeros in the antepenultimate column signify that there is no central vignetting.

The following conditions result when focussing:

The distance between the entrance surface at the front lens group 12 of the first subsystem and the focal plane 5 is 685.930 and constant.

In the present table, valid for focussing, the change in air space 14 (E(3)) and 11 (E(9)) for the various distances and the percentage change of the anamorphic factor are listed in the following columns:

| Distance | feet | E (3) mm | E (9) mm | d(Fy/Fx) % |
|---|---|---|---|---|
| Infinity |   | 6.500 | 96.719 | −1.03 |
|   | 200.00 | 7.493 | 95.565 | −0.95 |
|   | 100.00 | 8.444 | 94.405 | −0.87 |
|   | 75.00 | 9.083 | 93.627 | −0.81 |
|   | 50.00 | 10.369 | 92.062 | −0.70 |
|   | 30.00 | 12.984 | 88.897 | −0.49 |
|   | 25.00 | 14.312 | 87.295 | −0.38 |
|   | 20.00 | 16.330 | 84.868 | −0.22 |
|   | 18.00 | 17.466 | 83.506 | −0.13 |
|   | 17.00 | 18.138 | 82.701 | −0.08 |

-continued

| Distance feet | E (3) mm | E (9) mm | d(Fy/Fx) % |
|---|---|---|---|
| 16.00 | 18.898 | 81.793 | −0.02 |
| 15.00 | 19.766 | 80.757 | 0.05 |
| 14.00 | 20.763 | 79.567 | 0.12 |
| 13.00 | 21.924 | 78.185 | 0.21 |
| 12.00 | 23.2903 | 76.562 | 0.31 |
| 11.60 | 23.907 | 75.828 | 0.35 |
| 11.00 | 24.922 | 74.626 | 0.43 |
| 10.60 | 25.668 | 73.744 | 0.48 |
| 10.00 | 26.907 | 72.279 | 0.57 |
| 9.60 | 27.824 | 71.196 | 0.63 |
| 9.00 | 29.368 | 69.379 | 0.74 |
| 8.50 | 30.835 | 67.653 | 0.84 |
| 8.00 | 32.503 | 65.605 | 0.95 |
| 7.70 | 33.618 | 64.389 | 1.02 |

The relevant image distortion curves for the embodiment example 2 can be found in the several drawings of FIG. 4, the diagrams having to be interpreted in the same way as explained for FIG. 2. The following data gives information on the quality of the attachment: e.g. at a distance of 5 m from the first surface the maximum color deviation (440 and 660 nm) is smaller than 20 mm in both directions. At this distance, the spot diameter is for all colors smaller than 0.5 mm if the image is an axial image. The distance of a point with the coordinates 680 mm in the x-direction and 380 mm in the y-direction from the optical axis is smaller than 0.7 mm.

Embodiment Example 3

This embodiment example is particularly appropriate for professional photography at high speeds.

In this case, the following data applies:

|   |   |
|---|---|
|   | Fg = 100.00 |
|   | Fx = 62.71 |
|   | Fy = 131.00 |
| Number of glass surfaces | 14 |
| Number of colors | 4 |

| I | form | radii | distances | glass | refractive indices | | |
|---|------|-------|-----------|-------|------|------|------|
| 0 |    |          |         |        | 1.00000 | 1.00000 | 1.00000 |
| 1 | C8 | 394.285  | 15.291  | LaF N21| 1.78831 | 1.78332 | 1.79992 |
| 2 | CS | −331.901 | 6.116   | SF 11  | 1.78472 | 1.77599 | 1.80645 |
| 3 | C8 | Infinite | 100.224 | —      | 1.00000 | 1.00000 | 1.00000 |
| 4 | CS | Infinite | 10.920  | SF 11  | 1.78472 | 1.77599 | 1.80645 |
| 5 | CS | −257.733 | 4.160   | LaF N21| 1.78831 | 1.79332 | 1.79992 |
| 6 | C8 | 313.350  | 4.600   | —      | 1.00000 | 1.00000 | 1.00000 |
| 7 | CS | −140.753 | 4.255   | LaF N21| 1.78831 | 1.78332 | 1.79992 |
| 8 | CS | 60.706   | 10.500  | SF 11  | 1.78472 | 1.77599 | 1.80645 |
| 9 | CS | 285.948  | 51.328  | —      | 1.00000 | 1.00000 | 1.00000 |
| 10| C8 | Infinite | 3.255   | SF 11  | 1.78472 | 1.77599 | 1.80645 |
| 11| CS | 107.283  | 7.440   | LaF N21| 1.78831 | 1.78332 | 1.79992 |
| 12| C8 | −145.001 | 49.800  | —      | 1.00000 | 1.00000 | 1.00000 |
| 13| RS | 51.680   | 18.900  | BK 7   | 1.51680 | 1.51432 | 1.52238 |
| 14| R8 | Infinite | 0.000   | —      | 1.00000 | 1.00000 | 1.00000 |
| 1 | 0.000 | 0.000 | 90.000 | 0.000  | 118.072 | 86.454 | 97.763 |
| 2 | 0.000 | 0.000 | 90.000 | 0.000  | 115.653 | 83.783 | 96.174 |
| 3 | 0.000 | 0.000 | 90.000 | 0.000  | 113.296 | 82.509 | 94.397 |
| 4 | 0.000 | 0.000 | 90.000 | 0.000  | 67.758  | 49.482 | 61.433 |
| 5 | 0.000 | 0.000 | 90.000 | 0.000  | 65.383  | 47.474 | 59.748 |
| 6 | 0.000 | 0.000 | 90.000 | 0.000  | 63.695  | 46.709 | 58.429 |
| 7 | 0.000 | 0.000 | 90.000 | 90.000 | 62.881  | 45.801 | 57.858 |
| 8 | 0.000 | 0.000 | 90.000 | 90.000 | 62.097  | 45.478 | 57.530 |
| 9 | 0.000 | 0.000 | 90.000 | 90.000 | 60.977  | 45.223 | 56.482 |
| 10| 0.000 | 0.000 | 90.000 | 90.000 | 52.280  | 48.365 | 47.365 |
| 11| 0.000 | 0.000 | 90.000 | 90.000 | 52.071  | 48.580 | 47.029 |
| 12| 0.000 | 0.000 | 90.000 | 90.000 | 51.937  | 48.667 | 46.326 |
| 13| 0.000 | 0.000 |        |        | 79.907  | 79.907 | 79.907 |
| 14| 0.000 | 0.000 |        |        | 79.907  | 79.907 | 79.907 |

The following conditions result when focussing:

The distance between the entrance surface at the front lens group 12 of the first subsystem and the focal plane 5 is 375.012 and constant. In the present table, valid for focussing, the change of the air space 14 (E(3)) and 11 (E(9)) for the various distances and the percentagewise change of the anamorphic factor are listed in the following columns. In this case, the distances are as usual for filming devices specified as viewed from the film plane.

| Distance m | E (3) mm | E (9) mm | d(Fy/Fx) % |
|---|---|---|---|
| infinite | 96.425  | 57.780 | 4.45 |
| 50.00    | 96.918  | 56.975 | 3.91 |
| 30.00    | 97.244  | 56.439 | 3.55 |
| 20.00    | 97.648  | 55.771 | 3.10 |
| 15.00    | 98.047  | 55.104 | 2.65 |
| 10.00    | 98.830  | 53.773 | 1.75 |
| 7.50     | 99.593  | 52.449 | 0.84 |
| 5.00     | 101.057 | 49.823 | −0.96 |
| 4.00     | 102.095 | 47.876 | −2.31 |
| 3.50     | 102.803 | 46.499 | −3.27 |
| 3.00     | 103.702 | 44.682 | −4.54 |
| 2.50     | 104.868 | 42.179 | −6.32 |

The image distortion curves pertaining to the attachment according to the embodiment example 3 may be seen in FIG. 5, where the individual drawings are represented in the same way as represented and explained in FIGS. 2 and 4 for the other embodiment examples.

It should be obvious to those skilled in the art that variations and modifications of the disclosed embodiments of the invention can be made without departing from the scope and spirit of the invention as set forth in the following claims.

List of reference signs

1 = optical axis
2 = basic lens
3 = attachment
4 = object plane
5 = focal plane
6 = distance
7 = second subsystem
8 = first subsystem
9 = front lens group
10 = rear lens group
11 = air space
12 = front lens group
13 = rear lens group
14 = air space
15 = arrow
16 = arrow

I claim:

1. An anamorphic lens attachment (3) for purposes of filming and reproduction to be used in conjunction with the basic lens (2) of a camera or projection system, said attachment comprising a first lens subsystem (8) configured for enlargement (V1) in a first direction and a second lens subsystem (7) configured for enlargement (V2) in a second direction substantially perpendicular to the first direction, said first subsystem (8) including a positive front lens group (12) and a negative rear lens group (13) and said second subsystem (7) including a negative front lens group (9) and a positive rear lens group (10), said second subsystem (7) being disposed between said first subsystem (8) and the basic lens (2) of a camera or projection system, said lens groups of said attachment being configured and positioned such that when the focal length of the basic lens (2) is Fg, and the attachment object distance is set to "infinite", and the total focal length in the first direction is V1×Fg, and the total focal length in the second direction is V2×Fg, the following condition is met: $(V1/V2)^2 \times 0.85 \leq V1 < V2 \leq 1.15 \times (V2/V1)^2$.

2. An attachment according to claim 1 characterized in that all lenses used for the attachment have only refractive indices that do not differ from one another by more than 5%.

3. An attachment according to claim 1 and wherein the lenses of the attachment(s) are configured such that a predefined anamorphic factor (V1/V2) (nominal value) occurs between an object distance of infinity and the minimal object distance.

4. An attachment as claimed in claim 1 and further comprising means for adjusting said attachment for different object distances, said means including means for moving at least some of said lens groups relative to others of said lens groups substantially along an optical axis (1).

5. The attachment of claim 4 and wherein the rear lens group (13) of the second subsystem 8 and the front lens group (9) of the first subsystem (7) are movable along said optical axis.

6. The attachment of claim 5 and wherein the rear lens group (10) of the first subsystem (7) and the basic lens (2) are movable together along said optical axis.

7. The attachment as claimed in claim 1 and wherein at least one of the lens groups of said attachment is a composite lens formed of at least two lenses each having a different Abbe coefficient from the other.

8. For use with an existing lens system having an optical axis, an anamorphic lens attachment comprising a first lens subsystem having spaced converging and diverging lenses configured to enlarge an image in a first direction transverse to said optical axis and a second lens subsystem having spaced converging and diverging lenses configured to enlarge an image in a second direction transverse to said optical axis and substantially perpendicular to said first direction, said lenses of said first and second lens subsystems being arrayed substantially along said optical axis in converging-diverging-diverging-converging sequence and wherein the enlargement provided by said first lens subsystem in said first direction is V1 and the enlargement provided by the second lens subsystem in said second direction is V2 and wherein said lens subsystems are configured and positioned such that when the focal length of the basic lens is Fg and the attachment is set for an object distance of infinity and the focal length in the first direction is V1×Fg and the focal length in the second direction is V2×Fg, the condition $(V1/V2)^2 \times 0.85 < V1 < V2 < 1.15 \times (V2/V1)^2$ is met.

9. An anamorphic lens attachment as claimed in claim 8 and wherein said first lens subsystem is positioned to be disposed between said second lens subsystem and the existing lens system when the attachment is mounted to the existing lens system.

10. An anamorphic lens attachment as claimed in claim 8 and wherein the lenses of said first lens subsystem are interleaved with the lenses of said second lens subsystem.

11. An anamorphic lens attachment as claimed in claim 8 and wherein at least some of the lenses of said first and second lens subsystems are movable along said optical axis to adjust said attachment for different object distances.

12. An anamorphic lens attachment as claimed in claim 8 wherein the enlargement provided by said first lens subsystem in said first direction is V1 and the enlargement provided by said second lens subsystem in said second direction is V2 and wherein said lens subsystems are configured and positioned such that a pre-established nominal anamorphic factor (V1/V2) occurs between an object distance of infinity and a predetermined minimum object distance.

* * * * *